(12) United States Patent
Curry et al.

(10) Patent No.: US 12,316,089 B2
(45) Date of Patent: May 27, 2025

(54) CABLE STACKER

(71) Applicant: Southwire Company, LLC, Carrollton, GA (US)

(72) Inventors: Kyle Curry, Dunedin, FL (US); Agus Suryana The, Mesa, AZ (US)

(73) Assignee: Southwire Company, LLC

( * ) Notice: Subject to any disclaimer, the term of this patent is extended or adjusted under 35 U.S.C. 154(b) by 0 days.

(21) Appl. No.: 18/446,573

(22) Filed: Aug. 9, 2023

(65) Prior Publication Data

US 2024/0055846 A1 Feb. 15, 2024

Related U.S. Application Data

(60) Provisional application No. 63/370,888, filed on Aug. 9, 2022.

(51) Int. Cl.
*F16L 3/22* (2006.01)
*H02G 3/32* (2006.01)

(52) U.S. Cl.
CPC .................... *H02G 3/32* (2013.01)

(58) Field of Classification Search
CPC ...................................... H02G 3/32
See application file for complete search history.

(56) References Cited

U.S. PATENT DOCUMENTS

| | | | | |
|---|---|---|---|---|
| 5,615,850 | A * | 4/1997 | Cloninger | F16L 3/22 248/68.1 |
| 7,172,161 | B2 * | 2/2007 | Rosemann | F16L 3/02 248/548 |
| 7,740,210 | B2 * | 6/2010 | Pilon | F16L 3/2336 248/909 |
| 8,616,512 | B2 * | 12/2013 | McMath | H02G 3/32 248/304 |
| 10,871,025 | B2 * | 12/2020 | Gill | E06B 1/52 |
| 2007/0018057 | A1 * | 1/2007 | Kovac | F16L 3/237 248/68.1 |
| 2012/0217354 | A1 * | 8/2012 | Walraven | F16L 3/1091 248/74.1 |
| 2013/0240684 | A1 * | 9/2013 | Meyers | H02G 3/32 248/74.1 |
| 2017/0122459 | A1 * | 5/2017 | Haynes | F16L 3/20 |

* cited by examiner

*Primary Examiner* — Amy J. Sterling
(74) *Attorney, Agent, or Firm* — Merchant & Gould P.C.

(57) ABSTRACT

A cable stacker may be provided. The cable stacker may comprise a mounting bracket and a cable holder. The mounting bracket may comprise a first side, a front side, and a second side. The second side may be operable to break away from the front side. The cable holder may be attached to the mounting bracket. The cable holder may comprise a plurality of slots operative to hold a corresponding plurality of cables.

18 Claims, 5 Drawing Sheets

CABLE STACKER

RELATED APPLICATION

Under provisions of 35 U.S.C. § 119(e), Applicant claims the benefit of U.S. Provisional Application No. 63/370,888, filed Aug. 9, 2022, which is incorporated herein by reference.

BACKGROUND

A Thermoplastic-Sheathed (TPS) cable may comprise a toughened outer sheath of Polyvinyl Chloride (PVC) thermoplastic, covering one or more individual annealed copper conductors, themselves insulated with PVC. This type of wiring may be used for residential and light commercial construction. The flat version of the cable, with two insulated conductors and an uninsulated earth conductor (all within the outer sheath), is referred to as twin and earth.

One example of TPS cables may comprise Non-Metallic (NM) sheathed cable. NM cable is a flexible electrical cable that features an outer plastic sheathing that protects two or more insulated conductors, as well as a bare copper ground wire.

Each current carrying conductor may be insulated by an individual thermoplastic sheath, colored to indicate the purpose of the conductor concerned. The protective ground conductor may also be covered with green/yellow (or green only) insulation, although, in some countries, this conductor may be left as bare copper. With cables where the current carrying conductors are of a large Cross Sectional Area (CSA), the protective ground conductor may be smaller, with a lower continuous current carrying capacity. The conductors used may be solid in cross section or multi-stranded.

Metal staples have been used to fasten electrical cables, however, there may be disadvantages to securing electrical cables in this way. For example, when several cables are attached to wooden studs with staples, some of the cables may have to be placed close to the edges of the stud. Accordingly, these cables may be damage if a nail driven into the stud misses the stud when installing dry wall for example. Furthermore, the staples themselves may damage the cables. The staples may cut the cable's insulation if they are improperly positioned over the cable, or if they are driven too far into the stud.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Figure 1A:
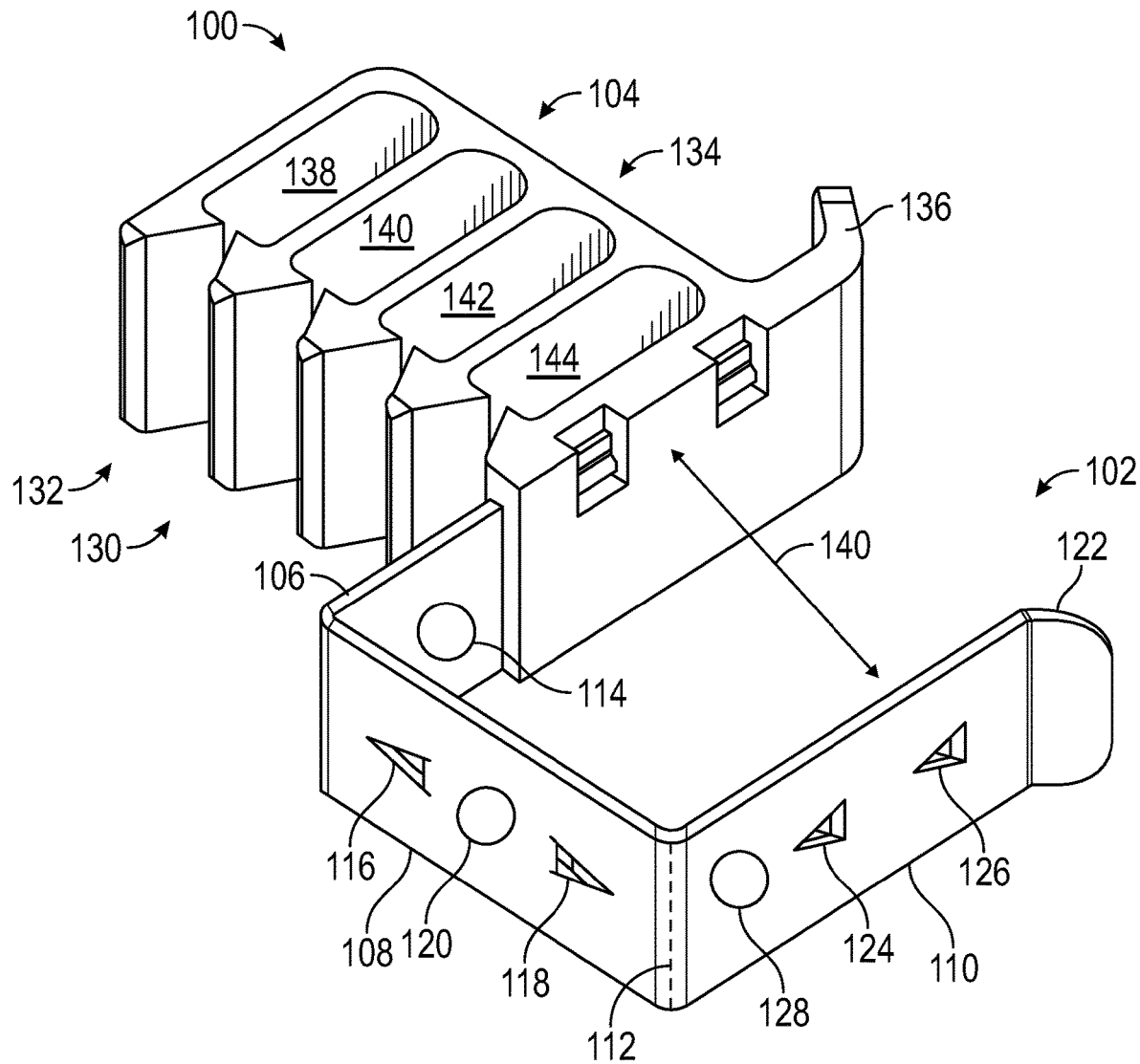
FIG. 1A shows a cable stacker.

A cable stacker may be provided. The cable stacker may comprise a mounting bracket and a cable holder. The mounting bracket may comprise a first side, a front side, and a second side. The second side may be operable to break away from the front side. The cable holder may be attached to the mounting bracket. The cable holder may comprise a plurality of slots operative to hold a corresponding plurality of cables.

Both the foregoing overview and the following example embodiments are examples and explanatory only, and should not be considered to restrict the disclosure's scope, as described and claimed. Further, features and/or variations may be provided in addition to those set forth herein. For example, embodiments of the disclosure may be directed to various feature combinations and sub-combinations described in the example embodiments.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

Electrical wiring is an electrical installation of cabling and associated devices such as switches, distribution boards, sockets, and light fittings in a structure. Wiring is subject to safety standards for design and installation. Allowable wire and cable types and sizes may be specified according to the circuit operating voltage and electric current capability, with further restrictions on the environmental conditions, such as ambient temperature range, moisture levels, and exposure to sunlight and chemicals.

Associated circuit protection, control, and distribution devices within a building's wiring system may be subject to voltage, current, and functional specifications. Wiring safety codes vary by locality, country, or region. The International Electrotechnical Commission (IEC) is attempting to harmonize wiring standards among member countries, but significant variations in design and installation requirements may still exist. Wiring installation codes and regulations may be intended to protect people and property from electrical shock and fire hazards. They may be based on a model code produced by a national or international standards organization.

Building wire and cable are used in the construction of almost every commercial, industrial, and residential property. Most commonly known as branch circuit wiring in homes and businesses, these products carry electrical current to all power applications in a building or dwelling.

Figure 1B:
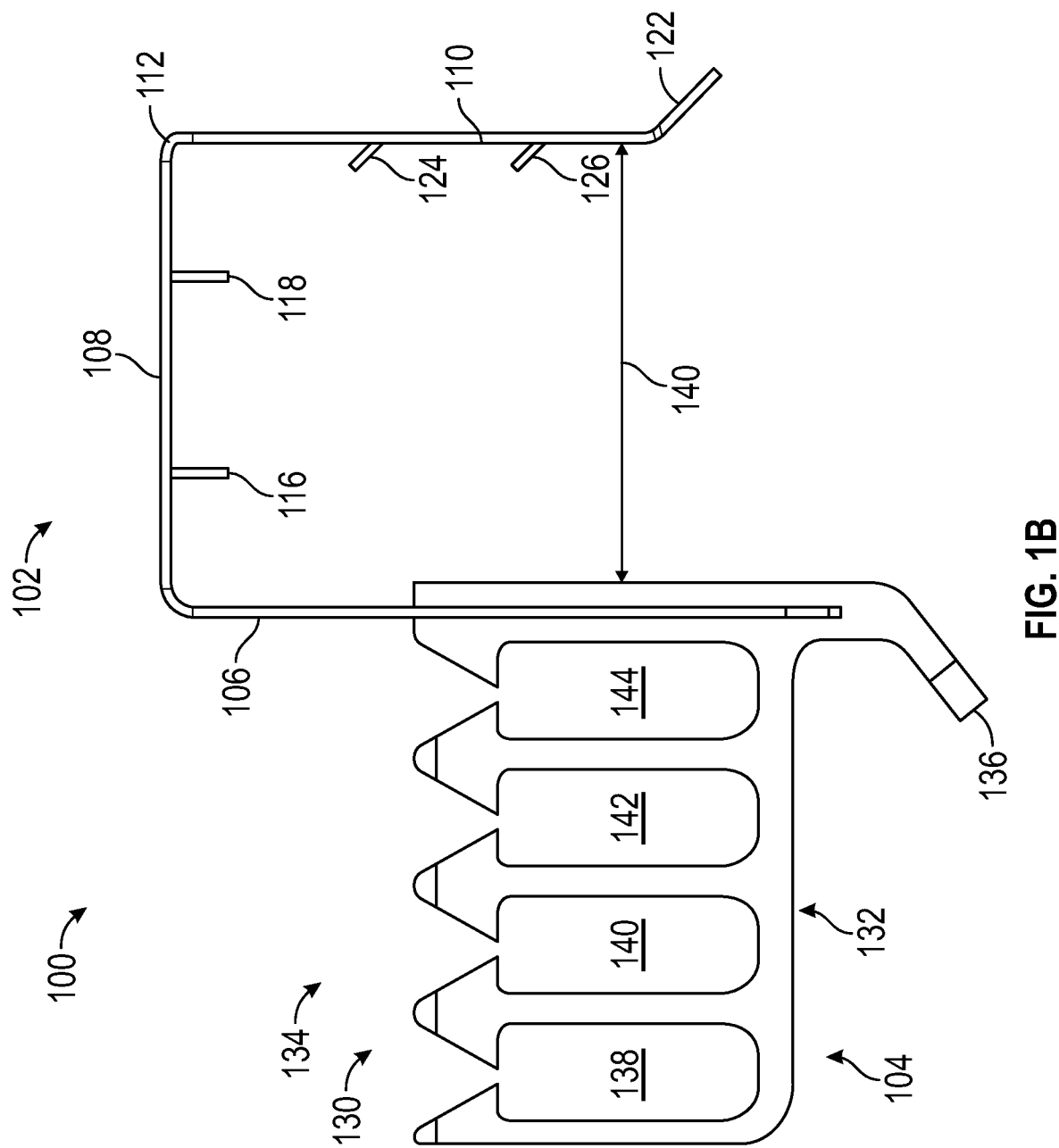
FIG. 1B shows a cable stacker.

FIG. 1A and FIG. 1B show a cable stacker 100. As shown in FIG. 1A and FIG. 1B, cable stacker 100 may comprise a mounting bracket 102 and a cable holder 104. Mounting bracket 102 may comprise a first side 106, a front side 108, a second side 110, and perforations 112. First side 106 may comprise a first fastener device hole 114. Front side 108 may comprise a first built-in nail feature 116, a second built-in nail feature 118, and a second fastener device hole 120. Second side 110 may comprise a first flange 122, a first grabbing feature 124, a second grabbing feature 126, and a third fastener device hole 128. Cable holder 104 may comprise a plurality of slots 130, a front 132, a back 134, and a second flange 136. Plurality of slots 130 may comprise a first slot 138, a second slot 140, a third slot 142, and a fourth slot 144. A distance 140 may exist between second side 110 and cable holder 104.

Figure 3A:
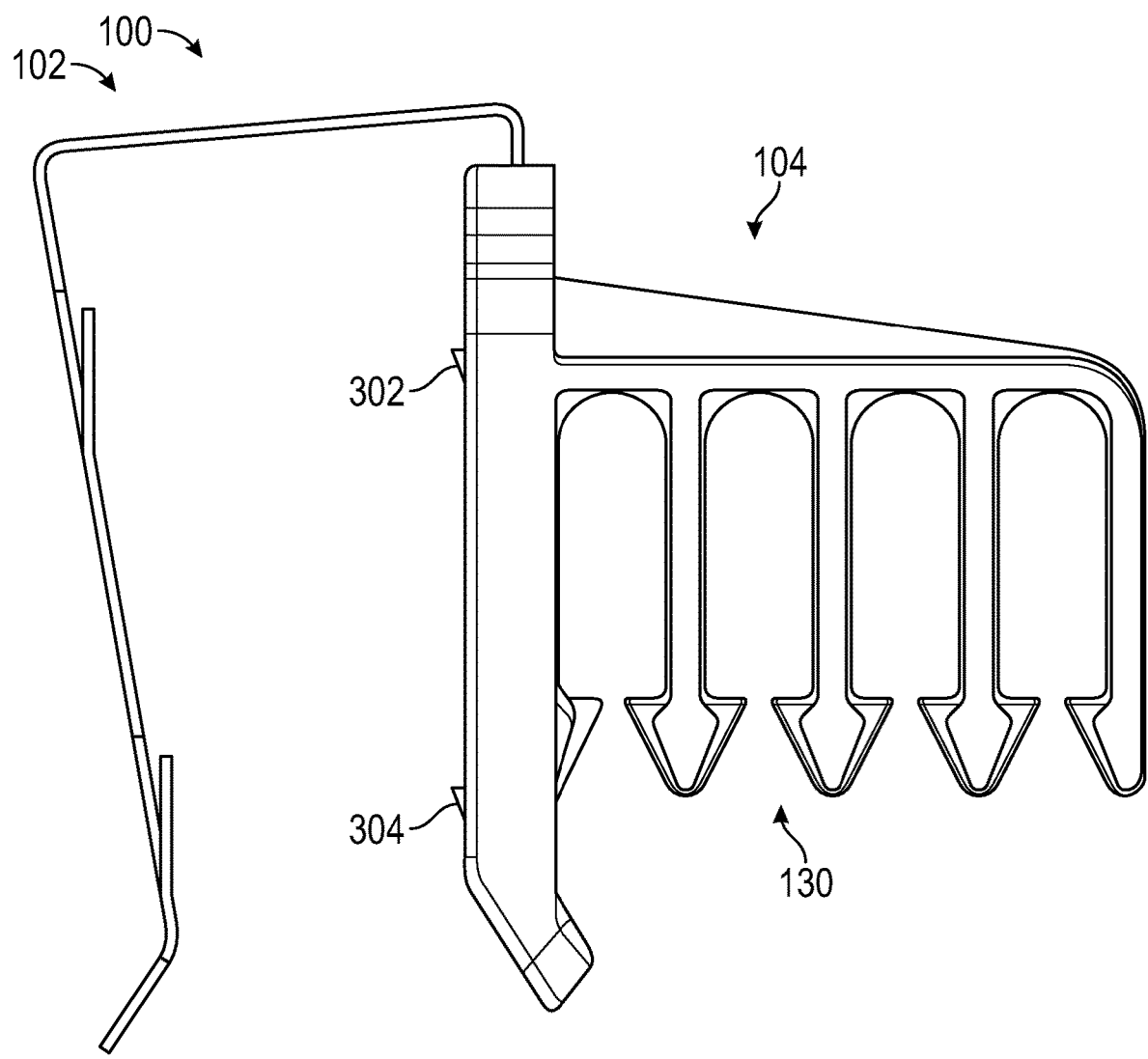
FIG. 3A shows a cable stacker.
Figure 3B:
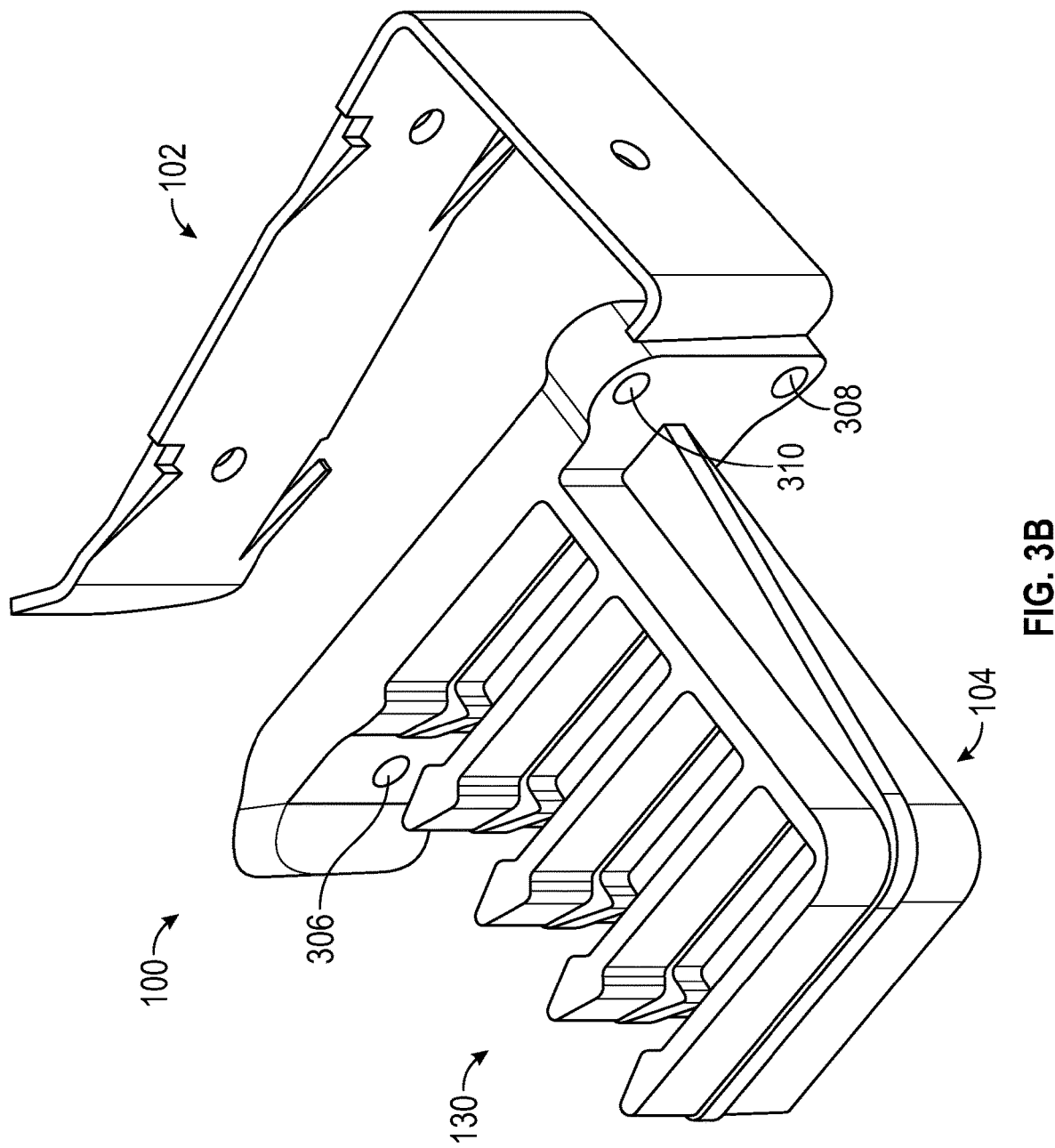
FIG. 3B shows a cable stacker.

Plurality of slots 130 may be operative to receive a corresponding plurality of cables from front 132 of cable holder 104. Consistent with embodiments of the disclosure, an orientation of plurality of slots 130 may be rotated 180 degrees (as illustrated by FIG. 3A and FIG. 3B below). In this embodiment, plurality of slots 130 may be operative to receive the corresponding plurality of cables from back 134 of cable holder 104. Each of the plurality of cables may comprise, but are not limited to, Non-Metallic (NM) sheathed electrical cables, coaxial cables, data cables, or communication cables. Consistent with embodiments of the disclosure, any one of the plurality of cables may comprise any type cable. While cable stacker 100 is shown with four slots, embodiments of the disclosure may comprise any number of slots (e.g., between two and four slots). Second side 110 may be shorter than the combination of first side 106 and cable holder 104.

FIGS. 1A and 1B show that cable stacker 100 may comprise a two-piece design comprising a first piece (i.e., mounting bracket 102) and a second piece (i.e., cable holder 104) that my "click" or "snap" together. In this embodiment, the first piece may be made of metal, for example, a spring material and the second piece may be injection molded. Cable stacker 100 is not limited to a two-piece design and may comprise a one-piece design or a multi-piece design.

When mounting bracket 102 is constructed, perforations may be deployed between front side 108 and second side 110. Furthermore, first built-in nail feature 116, second built-in nail feature 118, first grabbing feature 124, and second grabbing feature 126 may be stamped into mounting bracket 102. In addition, first fastener device hole 114, second fastener device hole 120, and third fastener device hole 128 may be deployed in mounting bracket 102. While FIGS. 1A and 1B show two built-in nail features, two grabbing features, and three fastener device holes, embodiments of the disclosure may comprise any number of built-in nail features, grabbing features, and fastener device holes deployed in any portion of mounting bracket 102.

Figure 2:
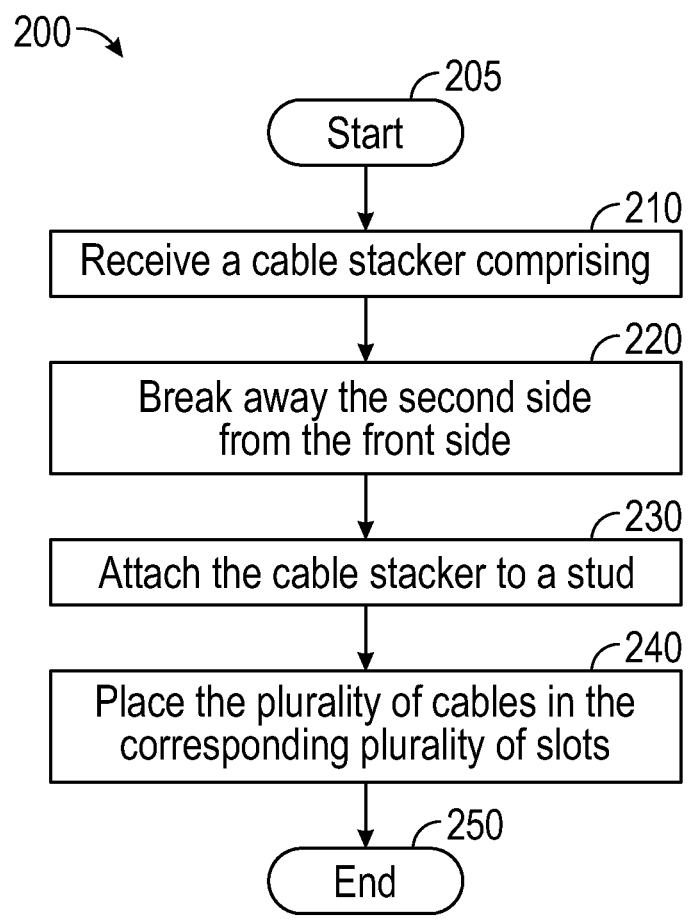
FIG. 2 shows a method for stacking cables.

FIG. 2 is a flow chart setting forth the general stages involved in a method 200 consistent with embodiments of the disclosure for stacking cables. Method 200 may be implemented by an operator using cable stacker 100 as described in more detail above with respect to FIG. 1A and FIG. 1B. Ways to implement the stages of method 200 will be described in greater detail below.

Method 200 may begin at starting block 205 and proceed to stage 210 where the operator may receive cable stacker 100. For example, cable stacker 100 may comprise: i) mounting bracket 102 comprising first side 106, front side 108, and second side 110 where second side 110 may be operable to break away from front side 108; and ii) cable holder 104 attached to mounting bracket 102 where cable holder 104 may comprise plurality of slots 130 operative to hold the corresponding plurality of cables.

From stage 210, where the operator may receive cable stacker 100, method 200 may advance to stage 220 where the operator may break away second side 110 from front side 108. For example, the operator may break away second side 110 from front side 108 along perforations 112 and discard second side 110.

Once the operator break second side 110 away from front side 108 in stage 220, method 200 may continue to stage 230 where the operator may attach cable stacker 100 to a stud in a wall. For example, distance 140 may comprise a value that may allow cable stacker 100 to slide onto and snuggly fit around a standard sized stud used to construct walls. While sliding onto the stud, second flange 136 and then first flange 122 may help guide cable stacker 100 onto the stud. First built-in nail feature 116, second built-in nail feature 118, first grabbing feature 124, and second grabbing feature 126 may help stabilize and fasten cable stacker 100 on the stud. Then fasteners (e.g., nails, screws, or staples) may be deployed in first fastener device hole 114, second fastener device hole 120, and third fastener device hole 128 to further fasten cable stacker 100 on the stud. In this way, consistent with embodiments of the disclosure, the operator may deploy cable stacker 100 in situations where there is a stud having approximately a width of distance 140.

However, in some situations, the stud may be wider than distance 140 or there may be two or more studs fastened together creating an overall width of the combined studs greater than distance 140. This situation may exist, for example, around doors or windows. In this situation, the operator may break second side 110 away from front side 108 along perforations 112. Then the operator may use first built-in nail feature 116 and second build-in nail feature 118 to help stabilize and fasten cable stacker 100 on the wider stud or combined studs. Then fasteners (e.g., nails, screws, or staples) may be deployed in first fastener device hole 114 and second fastener device hole 120 to further fasten cable stacker 100 on the wider stud or combined studs. In this way, consistent with embodiments of the disclosure, not only may the operator deploy cable stacker 100 in situations where there is a stud having approximately a width of distance 140, but the operator may also deploy cable stacker 100 in situations where there is a stud having a width greater than distance 140 or in situations where there is a combination of studs fastened together having a combined width greater than distance 140.

After the operator attaches cable stacker 100 to the stud in stage 230, method 200 may proceed to stage 240 where the operator may place the plurality of cables in corresponding plurality of slots 130. For example, plurality of slots 130 may comprise a plurality of walls having chamfers that may allow the walls to flex and snap back once a cable is in a corresponding slot. Once the operator places the plurality of cables in corresponding plurality of slots 130 in stage 240, method 200 may then end at stage 250.

FIGS. 3A and 3B show other embodiments of cable stacker 100. As shown in FIGS. 3A and 3B, consistent with embodiments of the disclosure, an orientation of plurality of slots 130 may be rotated 180 degrees as compared to the embodiments shown in FIG. 1A and FIG. 1B. Mounting bracket 102 may be pre-deformed as illustrated by FIG. 1A so that cable stacker 100 may be better able to grab a stud. Furthermore, cable holder 104 may comprise third grabbing feature 302 and a fourth grabbing feature 304 that may help stabilize and fasten cable stacker 100 on the stud. As shown in FIG. 3B, cable holder 104 may comprise fourth fastener device hole 306, fifth fastener device hole 308, and sixth fastener device hole 310. Fasteners (e.g., nails, screws, or staples) may be deployed in these fastener device hole to help attach cable stacker 100 to the stud.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A system comprising:
a mounting bracket comprising a first side, a front side, and a second side wherein the second side is operable to break away from the front side; and
a cable holder attached to the mounting bracket, the cable holder comprising a plurality of slots operative to hold a corresponding plurality of cables wherein the mounting bracket comprises a first piece and the cable holder comprises a second piece wherein the first piece and the second piece snap together.

2. The system of claim 1, wherein the plurality of slots are operative to receive the corresponding plurality of cables from a front of the cable holder.

3. The system of claim 1, wherein the plurality of slots are operative to receive the corresponding plurality of cables from a back of the cable holder.

4. The system of claim 1, further comprising perforations between the front side and the second side.

5. The system of claim 1, wherein each of the plurality of cables comprises a Non-Metallic (NM) sheathed electrical cable.

6. The system of claim 1, wherein the second side is shorter than the first side.

7. The system of claim 1, wherein the plurality of slots comprise between two and four slots.

8. The system of claim 1, wherein the cable holder is attached to the first side of the mounting bracket.

9. The system of claim 1, wherein the second side comprises a first flange and the cable holder comprise a second flange.

10. The system of claim 1, wherein the first piece is made of metal.

11. The system of claim 1, wherein the first piece is made of a spring material.

12. The system of claim 1, wherein the second piece is injection molded.

13. The system of claim 1, wherein the front side comprises at least one built-in nail feature.

14. The system of claim 1, wherein the second side comprises at least one grabbing feature.

15. The system of claim 1, wherein at least one of the first side, the front side, and the second side comprise a least one fastener device hole operative to receive a fastening device.

16. The system of claim 15, wherein the fastening device comprise one of the following: a nail, a screw, and a staple.

17. A system comprising:
a mounting bracket comprising a first side, a front side, and a second side wherein the second side is operable to break away from the front side along perforations between the front side and the second side; and
a cable holder attached to the mounting bracket, the cable holder comprising a plurality of slots operative to hold a corresponding plurality of cables wherein the mounting bracket comprises a first piece and the cable holder comprises a second piece wherein the first piece and the second piece snap together.

18. A method comprising:
receiving a cable stacker comprising;
a mounting bracket comprising a first side, a front side, and a second side wherein the second side is operable to break away from the front side, and
a cable holder attached to the mounting bracket, the cable holder comprising a plurality of slots operative to hold a corresponding plurality of cables;
breaking away the second side from the front side;
attaching the cable stacker to a stud; and
placing the plurality of cables in the corresponding plurality of slots.

* * * * *